United States Patent [19]
Cottin

[11] 3,732,757
[45] May 15, 1973

[54] HYDROSTATIC END PRESSURE BALANCING DEVICE FOR MACHINE TOOLS

[75] Inventor: Jean Claude Cottin, Paris 80, France

[73] Assignee: Produmatic, Chateauneuf en Thymerais, France

[22] Filed: Dec. 2, 1971

[21] Appl. No.: 204,205

[52] U.S. Cl. ..........................82/2, 82/28, 82/30, 82/31
[51] Int. Cl. ..............................B23b 3/00
[58] Field of Search.....................82/2, 28, 30, 31, 82/32

[56] References Cited

UNITED STATES PATENTS

| | | | |
|---|---|---|---|
| 3,661,042 | 7/1970 | Lender | 82/31 |
| 2,545,852 | 3/1951 | Kurzweil | 82/31 |
| 3,618,270 | 11/1971 | Folde | 82/28 R |
| 2,078,695 | 4/1937 | Svenson | 82/2 |

*Primary Examiner*—Andrew R. Juhasz
*Assistant Examiner*—Leon Gilden
*Attorney*—Amster & Rothstein

[57] ABSTRACT

In this balancing device for equalizing the pressure exerted on the tailstock dead center and the workpiece holding spindle of a machine tool, the tailstock center is responsive to the action of a piston slidably mounted in a cylinder having its rear chamber supplied with compressed hydraulic fluid and a distance-piece mounted about the spindle portion extending within the headstock urges said spindle through the medium of the inner race of the front bearing under the control of the compressed hydraulic fluid supplied to a chamber formed at the front by said distance-piece. A manual control is provided for hydraulically actuating said dead center either in the clamping direction towards said workpiece holding spindle or in the release direction.

4 Claims, 1 Drawing Figure

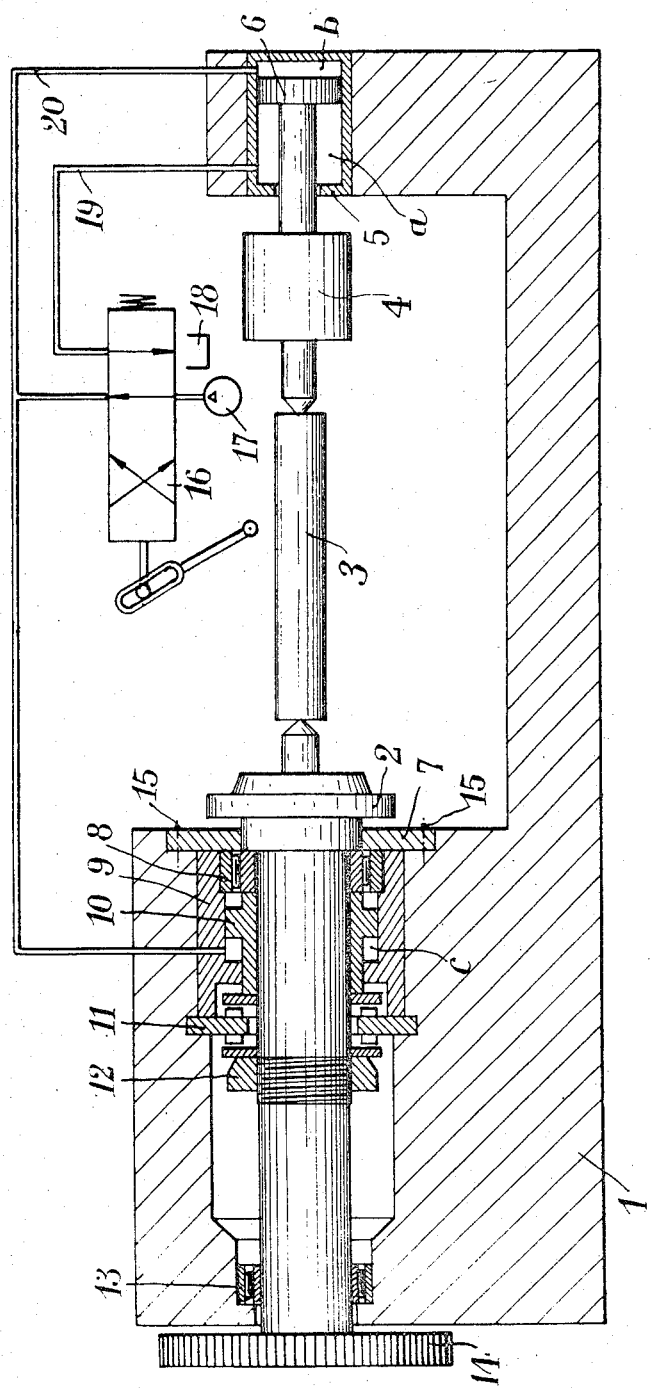

3,732,757

HYDROSTATIC END PRESSURE BALANCING DEVICE FOR MACHINE TOOLS

BACKGROUND OF THE INVENTION

This invention relates in general to machine tools and more particularly to means for limiting the wear and tear of guiding members, such as bearings, of the rotary tailstock dead center of a machine tool, notably a lathe.

Various devices have already been devised up to now for this purpose, but all of them are based on a strict consideration of the tail-stock center function alone, without taking due account of the structure cooperating therewith, namely the assembly comprising the workpiece-supporting headstock spindle, the workpiece proper and the tailstock dead center. Adhering to this point of view is tantamount to admitting that the headstock spindle supporting the workpiece is subjected not only to the longitudinal stress caused by the cutting action of the tools but also to the efforts due to the thrust from the tailstock dead center. Now this mode of action is particularly detrimental to the preservation of the precision of the spindle constituting in all cases the vital member of the machine.

It is the essential object of the present invention to avoid the inconvenience of abnormally overloading the guide members of a spindle when the machine tool is operated by using a tailstock center exerting a substantial axial thrust, and to subject these guide members only to the efforts deriving from the tools working on the workpiece, whether these efforts are directed towards the tailstock center or in the opposite direction.

The problem at the basis of this invention and to be solved thereby consists in applying a strict and constant hydrostatic axial balancing action or force to the spindle as a function of the axial thrust developed by the tailstock center and directed towards said spindle across the workpiece.

SUMMARY OF THE INVENTION

The solution consists in exerting a pressure against the tailstock center by means of the rod of a piston having its rear or outer face exposed to the action of a compressed hydraulic fluid while a tubular distance-piece surrounding the workpiece-supporting spindle mounted in the headstock of the machine and forming with a socket rigidly fitted in said headstock an annular chamber supplied with hydraulic fluid under pressure is effective, under the control of this compressed hydraulic fluid, to exert against the spindle a thrust equal and opposed to that exerted against the tailstock center.

BRIEF DESCRIPTION OF THE DRAWING

A typical form of embodiment of this invention will now be described by way of example with reference to the accompanying drawing of which the single FIGURE illustrates very diagrammatically in axial section a lathe or like machine tool equipped with the thrust balancing means of this invention.

DESCRIPTION OF THE PREFERRED EMBODIMENT

The assembly illustrated in the drawing comprises a main frame structure 1, a spindle 2, and a face plate 7 secured to the headstock of frame structure 1 by means of screws 15. The function of face plate 7 is to lock a socket 9 and the intermediate member 11 of a double-acting thrust bearing 11 in the headstock. The socket 9 is also adapted to hold in position the outer race of the front rolling-contact bearing 8 of spindle 2.

Mounted on the spindle 2 acting as the workpiece holder are, in succession: the inner race of said front bearing 8, a distance-piece 10, the two operative rotary members of the double-acting thrust bearing 11 and the nut 12 for adjusting the axial play of the workpiece-supporting spindle 2. This spindle 2 is carried at its rear end by another rolling-contact bearing 13 fitted in the headstock 1 and supports externally of this headstock 1 a toothed wheel or other member 14 for rotatably driving this spindle 2.

Clamped and centered between the center of the workpiece-supporting spindle 2 and the free or dead center 4 of the tailstock is the workpiece 3 to be machined. The dead center 4 is urged against spindle 2 by a hydraulic actuator comprising a cylinder 5 and a piston 6. According to the essential feature of this invention the socket 9 and distance-piece 10 form together in the headstock a balancing chamber $c$ having the same cross-sectional area as the thrust chamber $b$ of piston 6 urging the dead center 4 towards the spindle 7, and these two chambers $c$ and $b$ are fed simultaneously, during the work, from a common source 17 of fluid under pressure via a distributor 16 and pipe lines 19 and 20. Thus, the thrust exerted by the dead center actuator 5, 6 towards the workpiece supporting spindle is balanced exactly by a thrust of same value but opposite direction which is applied directly to the spindle proper, without passing through the thrust bearing 11.

As clearly shown by the circuit illustrated for supplying hydraulic fluid under pressure to chambers $a$, $b$ and $c$, when it is desired to feed the dead center 4 towards the workpiece 3, fluid under pressure is delivered to chamber $b$ while connecting chamber $a$ to the fluid reservoir 18. To retract the dead center 4, the operator directs fluid under pressure to chamber $a$ of actuator 5, 6 while the other chambers $b$ and $c$ are connected to the reservoir 18. When chambers $b$ and $c$ are connected to the fluid supply and chamber $a$ is connected to the reservoir 18, the forces acting against the spindle 7 and dead center 4, respectively, are strictly equal and opposed to each other.

Of course, many modifications and variations could be brought to the above-described construction without inasmuch departing from the spirit and scope of the invention. More particularly, if desired the hydraulic pressures applied to chambers $b$ and $c$ could have different values, the cross-sectional areas to which this fluid is applied being in inverse ratio to the pressures obtaining in these two chambers.

What I claim is:

1. In a machine tool comprising a rigid frame structure having a headstock and a tailstock, a device for balancing the thrust exerted by the tailstock dead center towards the workpiece holding spindle rotatably mounted in said headstock, which comprises a cylinder mounted in the tailstock, a piston slidably mounted in said cylinder and forming therein a rear chamber and a front chamber and having a rod emerging from said cylinder and provided with a dead center at its outer end, a socket fitted in said headstock in axial alignment with said dead center, a tubular distance-piece surrounding said headstock spindle and shaped to form an annular chamber in said socket, means for longitudinally fastening said distance-piece to said workpiece holding spindle, and circuit means for supplying hydraulic fluid under pressure to chambers formed in said cylinder by said piston for controlling the forward and backward movements of said tailstock dead center, and to the chamber formed in said socket by said tubular distance-piece for controlling an axial thrust of said distance-piece against said workpiece holding spindle and therefore of said spindle against said tailstock dead center.

2. Balancing device as set forth in claim 1, in the case of a machine tool comprising, for the axial sliding mounting of said workpiece holding spindle in said headstock, a pair of rolling-contact bearings having each an inner race rigid with said spindle, wherein the means for longitudinally fastening said distance-piece to said spindle consist of the inner race of the front rolling-contact bearing behind which said distance-piece is mounted around said spindle.

3. Balancing device as set forth in claim 1, wherein compressed hydraulic fluid at the same pressure is utilized for controlling said tailstock dead center and said workpiece holding spindle, the cross-sectional surface areas exposed to the action of the compressed fluid in said tailstock dead center and said spindle having the same value.

4. Balancing device as set forth in claim 3, wherein the circuit for supplying hydraulic fluid under pressure comprises a source of compressed hydraulic fluid, a reservoir for uncompressed hydraulic fluid and a manually operated control for connecting either the rear chamber formed in said cylinder by said piston, and also the annular chamber formed in said socket by said tubular distance-piece to said source, on the one hand, and the front chamber formed by said piston in said cylinder to said reservoir, on the other hand, for controlling the clamping movement of said tailstock dead center towards said spindle, or said front chamber formed by said piston in said cylinder to said source and said rear chamber formed by said piston in said cylinder, and said annular chamber to said reservoir, for controlling the workpiece release and the disengagement of said tailstock dead center.

* * * * *